United States Patent [19]

Amro et al.

[11] Patent Number: 5,977,970

[45] Date of Patent: Nov. 2, 1999

[54] METHOD AND APPARATUS FOR MOVING INFORMATION DISPLAYED IN A WINDOW

[75] Inventors: Hatim Yousef Amro, Austin; John Paul Dodson, Pflugerville, both of Tex.

[73] Assignee: International Business Machines Corporation, Armonk, N.Y.

[21] Appl. No.: 08/971,169

[22] Filed: Nov. 14, 1997

[51] Int. Cl.$^6$ ................................................ G06F 3/14
[52] U.S. Cl. .................... 345/340; 345/341; 345/123; 345/145; 345/157
[58] Field of Search ..................... 345/340, 339, 345/357, 157, 145, 173, 341, 123, 125, 973

[56] References Cited

U.S. PATENT DOCUMENTS

| | | | |
|---|---|---|---|
| 4,786,897 | 11/1988 | Takanashi et al. | 340/721 |
| 5,187,776 | 2/1993 | Yanker | 395/157 |
| 5,263,134 | 11/1993 | Paal et al. | 395/158 |
| 5,333,247 | 7/1994 | Gest et al. | 345/341 |
| 5,434,591 | 7/1995 | Goto et al. | 345/123 |
| 5,465,362 | 11/1995 | Orton et al. | 395/700 |
| 5,485,174 | 1/1996 | Henshaw et al. | 345/123 |
| 5,517,605 | 5/1996 | Wolf | 395/155 |
| 5,546,520 | 8/1996 | Cline et al. | 395/155 |
| 5,553,225 | 9/1996 | Perry | 395/157 |
| 5,634,080 | 5/1997 | Kikinis et al. | 395/893 |
| 5,655,094 | 8/1997 | Cline et al. | 345/341 |
| 5,664,132 | 9/1997 | Smith | 345/352 |
| 5,748,185 | 5/1998 | Stephan et al. | 345/173 |
| 5,754,161 | 5/1998 | Noguchi et al. | 345/123 |
| 5,798,749 | 8/1998 | Minematsu et al. | 345/123 |

*Primary Examiner*—Raymond J. Bayerl
*Assistant Examiner*—Thomas T. Nguyen
*Attorney, Agent, or Firm*—Richard A. Henkler

[57] ABSTRACT

A method and apparatus for providing the user of a computing device displaying information to control the navigational aspects of the displaying while retaining ease of use and other desireable characteristics. Specifically, the user is provided with an opaque box having a dot located in the center which can be dragged and dropped. The dragging and dropping of the dot controlling the distance and direction with which the information is moved.

19 Claims, 17 Drawing Sheets

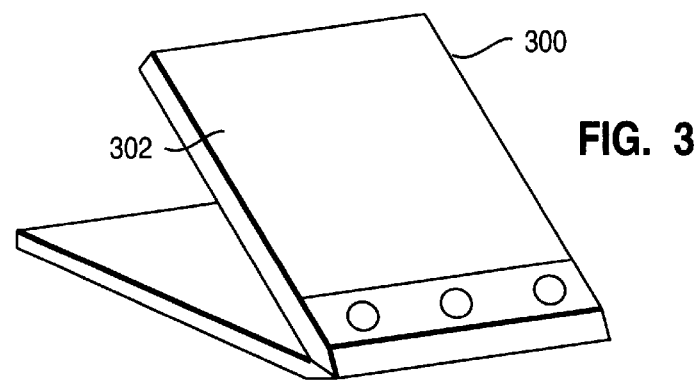
PERSONAL DIGITAL ASSISTANT
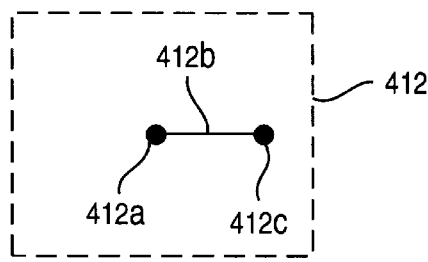
FIG. 5
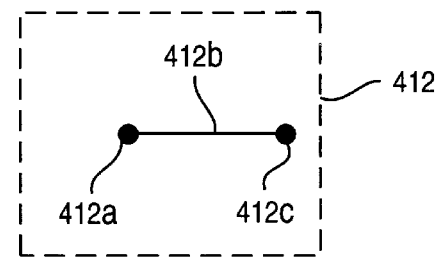
FIG. 6
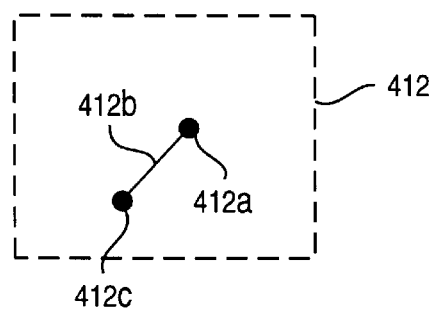
FIG. 7
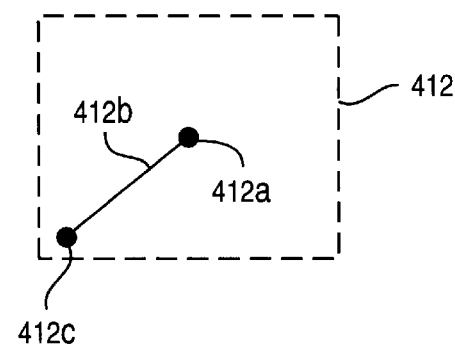
FIG. 8

METHOD AND APPARATUS FOR MOVING INFORMATION DISPLAYED IN A WINDOW

BACKGROUND

1. Field of the Present Invention

The present invention generally relates to computer systems, and more particularly, to methods and apparatuses which provide means for moving information that is displayed within a window.

2. Description of the Related Art

The use of personal computers and their counterparts (e.g. personal digital assistants) has created a new found love by the consumer for ever increased speed, functionality, and of course decreased size.

Anyone who has ever operated these miniature, sometimes fully functional, computers has first hand knowledge that while they provide increased portability, they unfortunately also provide a corresponding miniature display. The smaller display, of course, limits the amount of screen real estate available for presenting information.

The problems associated with presenting information to the user for these type of devices have been recognized, and attempts have been made to alleviate them. In fact, various improvements have been provided over the years that allow the user better and easier access (e.g. windows, scroll bars etc.) to the displayed information. Although these improvements have increased the ability of the user to access the displayed information, they still lack the required navigational functionality while retaining speed and ease of use by the user.

It would, therefore, be a distinct advantage to have a method and apparatus which would provide improved navigational functionality for window type environments. The present invention provides such a method and system.

SUMMARY OF THE PRESENT INVENTION

The present invention provides the user of a computing device, displaying information, to control the navigational aspects of the display while retaining ease of use and other desireable characteristics. Specifically, the user is provided with an opaque box having a dot located in the center which can be dragged and dropped. The dragging and dropping of the dot controls the distance, and direction with which the information is moved.

BRIEF DESCRIPTION OF THE DRAWINGS

The present invention will be better understood and its numerous objects and advantages will become more apparent to those skilled in the art by reference to the following drawings, in conjunction with the accompanying specification, in which:

FIG. 3 is a diagram of a personal digital assistant that can be used for implementing the teachings of the present invention;

FIG. 5 is a diagram illustrating a right horizontal movement for moving the information displayed within the browser of FIG. 4 according to the teachings of the present invention;

FIG. 6 is a diagram illustrating a right horizontal movement for moving the information displayed within the browser of FIG. 4 according to the teachings of the present invention;

FIG. 7 is a diagram illustrating a left downward diagonal movement for moving the information displayed within the browser of FIG. 4 according to the teachings of the present invention;

FIG. 8 is a diagram illustrating a left downward diagonal movement for moving the information displayed within the browser of FIG. 4 according to the teachings of the present invention;

DETAILED DESCRIPTION OF THE PREFERRED EMBODIMENT OF THE PRESENT INVENTION

In the following description, numerous specific details are set forth such as specific word or byte lengths, etc., to provide a thorough understanding of the present invention.

However, it will be obvious to those of ordinary skill in the art that the present invention can be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention, and are within the skills of persons of ordinary skill in the relevant art.

Figure 1:
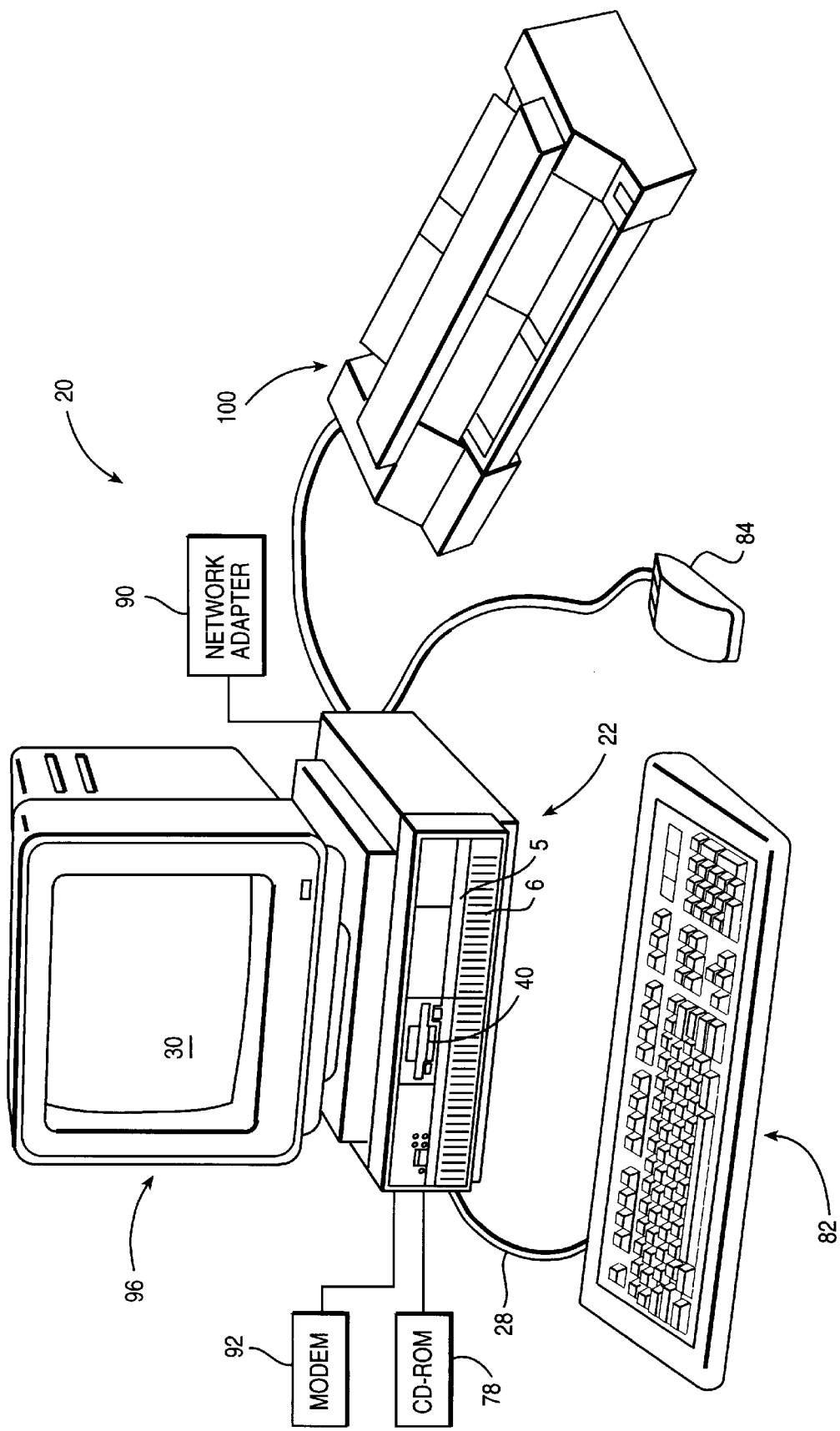
FIG. 1 is a diagram of a data processing system in which the present invention can be practiced.

Reference now being made to FIG. 1, a data processing system 20 is shown in which the present invention can be practiced. The data processing system 20 includes processor 22, keyboard 82, and display 96. Keyboard 82 is coupled to processor 22 by a cable 28. Display 96 includes display screen 30, which may be implemented using a cathode ray tube (CRT) a liquid crystal display (LCD) an electrode luminescent panel or the like. The data processing system 20 also includes pointing device 84, which may be implemented using a track ball, a joy stick, touch sensitive tablet or screen, track path, or as illustrated a mouse. The pointing device 84 may be used to move a pointer or cursor on display screen 30. Processor 22 may also be coupled to one or more peripheral devices such as modem 92, CD-ROM 78, network adapter 90, and floppy disk drive 40, each of which may be internal or external to the enclosure or processor 22. An output device such as printer 100 may also be coupled with processor 22.

It should be noted and recognized by those persons of ordinary skill in the art that display 96, keyboard 82, and pointing device 84 may each be implemented using anyone of several known off-the-shelf components.

Figure 2:
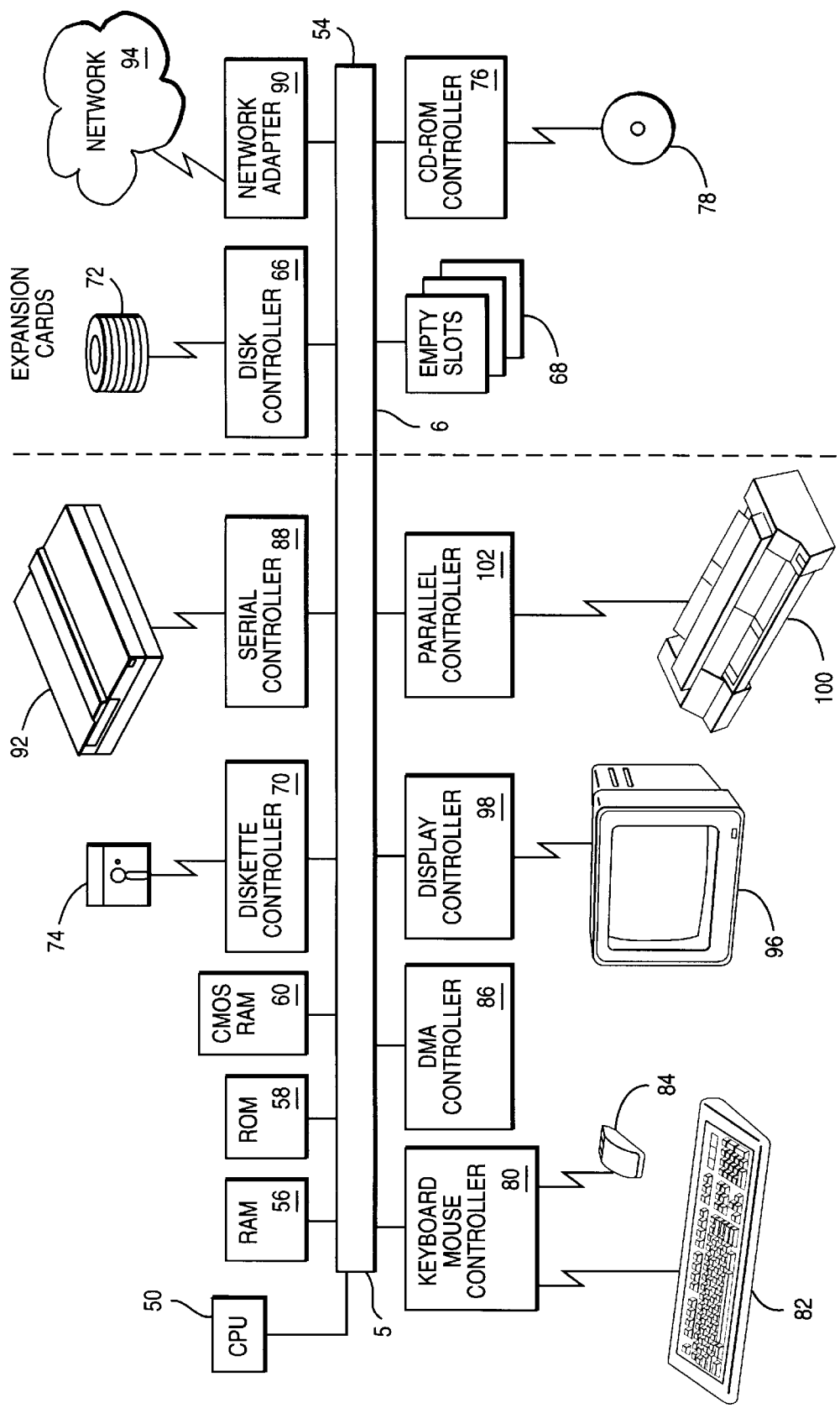
FIG. 2 is a high level block diagram illustrating selected components that can be included in the data processing system of FIG. 1 according to the teachings of the present invention.

Reference now being made to FIG. 2, a high level block diagram is shown illustrating selected components that can be included in the data processing system 20 of FIG. 1 according to the teachings of the present invention. The data processing system 20 is controlled primarily by computer readable instructions, which can be in the form of software, wherever, or by whatever means such software is stored or accessed. Such software may be executed within the Central Processing Unit (CPU) 50 to cause data processing system 20 to do work.

Memory devices coupled to system bus 5 include Random Access Memory (RAM) 56, Read Only Memory (ROM) 58, and non-volatile memory 60. Such memories include circuitry that allows information to be stored and retrieved. ROMs contain stored data that cannot be modified. Data stored in RAM can be changed by CPU 50 or other hardware devices. Nonvolatile memory is memory that does not loose data when power is removed from it. Nonvolatile memories include ROM, EPROM, flash memory, or battery-pack CMOS RAM. As shown in FIG. 2, such battery-pack CMOS RAM may be used to store configuration information.

An expansion card or board is a circuit board that includes chips and other electronic components connected that adds functions or resources to the computer. Typically expansion cards add memory, disk-drive controllers 66, video support, parallel and serial ports, and internal modems. For lap top, palm top, and other portable computers, expansion cards usually take the form of PC cards, which are credit card-sized devices designed to plug into a slot in the side or back of a computer. An example such a slot is PCMCIA slot (Personal Computer Memory Card International Association) which defines type 1, 2 and 3 card slots. Thus, empty slots 68 may be used to receive various types of expansion cards or PCMCIA cards.

Disk controller 66 and diskette controller 70 both include special purpose integrated circuits and associated circuitry that direct and control reading from and writing to hard disk drive 72, and a floppy disk or diskette 74, respectively. Such disk controllers handle task such as positioning read/write head, mediating between the drive and the CPU 50, and controlling the transfer information to and from memory. A single disk controller may be able to control more than one disk drive.

CD-ROM controller 76 may be included in data processing 20 for reading data from CD-ROM 78 (compact disk read only memory). Such CD-ROMs use laser optics rather then magnetic means for reading data.

Keyboard mouse controller 80 is provided in data processing system 20 for interfacing with keyboard 82 and pointing device 84. Such pointing devices are typically used to control an on-screen element, such as a cursor, which may take the form of an arrow having a hot spot that specifies the location of the pointer when the user presses a mouse button. Other pointing devices include the graphics tablet, the stylus, the light pin, the joystick, the puck, the trackball, the trackpad, and the pointing device sold under the trademark "TrackPoint" by IBM.

Communication between processing system 20 and other data processing systems may be facilitated by serial controller 88 and network adapter 90, both of which are coupled to system bus 5. Serial controller 88 is used to transmit information between computers, or between a computer and peripheral devices, one bit at a time over a single line. Serial communications can be synchronous (controlled by some standard such as a clock) or asynchronous (managed by the exchange of control signals that govern the flow of information). Examples of serial communication standards include RS-232 interface and the RS-422 interface. As illustrated, such a serial interface may be used to communicate with modem 92. A modem is a communication device that enables a computer to transmit information over a standard telephone line. Modems convert digital computer signals to interlock signals suitable for communications over telephone lines. Modem 92 can be utilized to connect data processing system 20 to an on-line information service, such as an information service provided under the service mark "PRODIGY" by IBM and Sears. Such on-line service providers may offer software that may be down loaded into data processing system 20 via modem 92. Modem 92 may provide a connection to other sources of software, such as server, an electronic bulletin board, the Internet or World Wide Web.

Network adapter 90 may be used to connect data processing system 20 to a local area network 94. Network 94 may provide computer users with means of communicating and transferring software and information electronically. Additionally, network 94 may provide distributed processing, which involves several computers in the sharing of workloads or cooperative efforts in performing a task.

Display 96, which is controlled by display controller 98, is used to display visual output generated by data processing system 20. Such visual output may include text, graphics, animated graphics, and video. Display 96 may be implemented with CRT-based video display, an LCD-based flat panel display, or a gas plasma-based flat-panel display. Display controller 98 includes electronic components required to generate a video signal that is sent to display 96.

Printer 100 may be coupled to data processing system 20 via parallel controller 102. Printer 100 is used to put text or a computer-generated image on paper or on another medium, such as transparency. Other type of printers may include an image setter, a plotter, or a film recorder.

Parallel controller 102 is used to send multiple data and control bits simultaneously over wires connected between system bus 5 and another parallel communication device, such as printer 100.

CPU 50 fetches, decodes, and executes instructions, and transfers information to and from other resources via the computers main data-transfer path, system bus 5. Such a bus connects the components in a data processing system 20 and defines the medium for data exchange. System bus 5 connects together and allows for the exchange of data between memory units 56, 58, and 60, CPU 50, and other devices as shown in FIG. 2.

The present invention provides a new and improved means for navigating within a window, e.g. a dialog, browser, or the like. The present invention is applicable to all types of computers (e.g. FIG. 1) and can be particularly benefical for a personal digital assistant such as that illustrated in FIG. 3.

As shown in FIG. 3, personal digital assistant 300 includes a display area 302 for relaying information to the user. This area 302 is typically limited in overall width and length such that any information that is displayed within a window must have means, such as scroll bars, in order to view the information in its entirety.

Reference now being made to browser 400 operating shown illustrating a web browser 400 operating in accordance with the preferred embodiment of the present invention. Web browser 400 includes standard window controls such as horizontal 404 and vertical 402 scroll bars for controlling movement of information contained within the display area 410. Web browser 400 also includes a menu bar 410, and an icon bar 408 for providing various functions. The use and function of scroll bars 402 and 404, menu and icon bars, 410 and 408 are well known and understood by those skilled in the art, and therefore, further discussion concerning them is deemed unnecessary.

It should also be noted that although the discussion hereinafter refers to a web browser 400, the present invention is not to be limited to any particular dialog or specific type window environment, but is equally applicable to any current as well as future display environments which require the information to be scrolled within the available display area.

Figure 4:
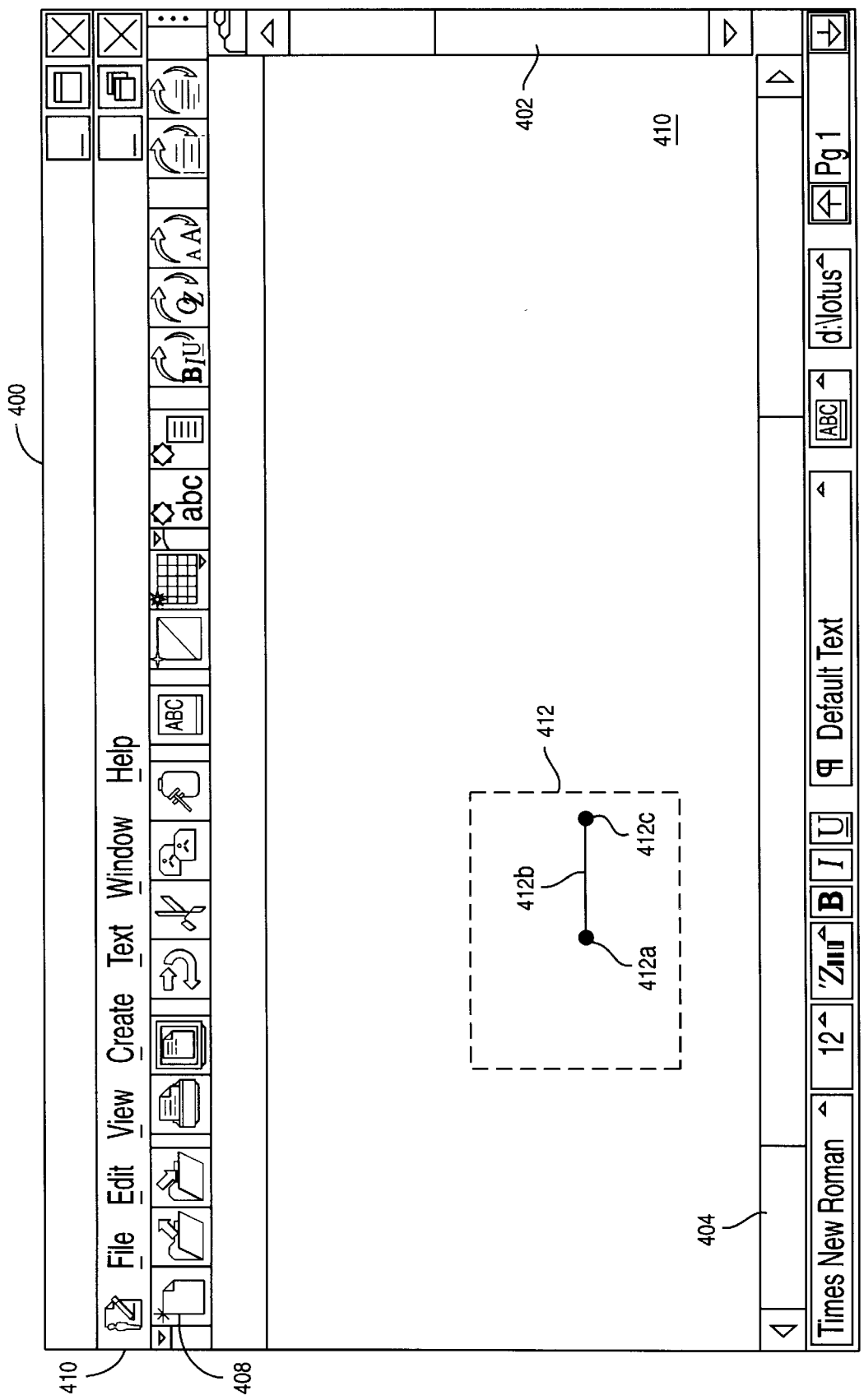
FIG. 4 is a diagram is illustrating a web browser operating in accordance with the preferred embodiment of the present invention.

With continuing reference to FIG. 4, noted within the display area 410 is an opaque outlined navigational area 412 (i.e. in the preferred embodiment a box (square)). Although the present invention uses a square for the preferred implementation of the navigational area 412, the present invention could easily be adapted to use any desirable shape which allows the navigational features described hereinafter (e.g. circle, octagon, etc.).

Located within box 412 is an initial location designator (referred to hereinafter as dot) 412*a*. The dot 412*a* is illustrated as residing in the center of the box 412. The location of dot 412*a* can directly correspond to the present location with respect to the displayed information (i.e. box 412 has a one-to-one correspondence with the entire size of the information to be displayed). Alternatively, the dot 412*a* can also reside at a home location such as the center of the box 412. In addition, although the box 412 is described as being opaque, this also not to be considered a limitation, and in fact, the display of the box 412 can be of any color, provided it accomplishes minimum interference between the displayed information and itself as viewed by the user.

Navigation of the information to be displayed can be accomplished using conventional keys (e.g. up, down, page up, page down, home, etc.), or the horizontal and vertical scroll bars 404, and 402, respectively. Unfortunately, when displaying information within a window such as web browser 400, the display area 410 can become relatively limiting. This can result from either the size of the window itself or the device used for displaying the window. Regardless, when a user is presented with the above noted conventional means for viewing the information in its entirety, navigation via the conventional means can become cumbersome, if not, annoying.

To alleviate, if not eliminate, the limitations of the noted conventional means, the present invention allows the user to perform navigation in any direction by simply directing the dot 412*a* to move from its initial location to a new location, such as 412*c*. The indications for moving the dot 412*a* to the new location 412*c* are those which are already used by window type environments, and are referred to hereinafter as dragging and dropping.

During the dragging of the dot 412 to its final or proposed destination 412*c*, a distance indicator (line) 412*b* is continually displayed for illustrating the distance between the original location of dot 412, and the current proposed location 412*c* until the dot 412 is dropped (placed). It should be noted that, in accordance with standard window type conventions for dragging and dropping, dot 412 is now shown in two locations, with the proposed location 412*c* and the line 412*b* being illustrated in a manner so as to indicate their indefiniteness until the drag and drop sequence is completed.

The above noted dragging and dropping is typically accomplished via the use of a mouse or other pointing device. It should be clearly understood, however, that the navigational aspects of the present invention are not intended to be limited to any particular hardware for performing the above noted dragging and dropping function.

The length of the line 412*b* (distance indicator) is directly proportional to the distance and direction of movement for the displayed information in the indicated direction. For example, as noted in FIG. 4, the dot 412*a* is dragged to the right as indicated by proposed drop location 412*c*.

FIGS. 5–8 illustrate the use of box 412 to navigate the movement of information within a window. The particular window controlled by the illustrated box 412 is not shown in order to better clarify the description of the functions of the present invention.

Reference now being made to FIG. 5, a diagram is shown illustrating a right horizontal movement for moving the information displayed within the browser 400 of FIG. 4 according to the teachings of the present invention. As noted in FIG. 5, the dot 412*a* has been dragged to a proposed destination of 412*c* having a distance indication shown by line 412*b*. Once dot 412 has been dropped in the proposed location 412*b*, the information displayed is moved horizontally to the right for a distance and direction which corresponds to the length of line 412*b*. If the box 412 has a one-to-one correspondence with the displayed information, then the information has been moved horizontally to the right for a portion of the maximum movement permitted in the indicated direction.

Reference now being made to FIG. 6, a diagram is shown illustrating a right horizontal movement for moving the information displayed within the browser 400 of FIG. 4 according to the teachings of the present invention. As noted in FIG. 6, the dot 412*a* has been dragged to a proposed destination of 412*c* having a distance indication shown by line 412*b*. Once dot 412 has been dropped in the proposed location 412*b*, the information displayed is moved horizontally to the right for a distance and direction which corresponds to the length of line 412*b*. If the box 412 has a one-to-one correspondence with the displayed information, then the information has been moved horizontally to the right for the maximum position permitted for such a movement.

Reference now being made to FIG. 7, a diagram is shown illustrating a left downward diagonal movement for moving the information displayed within the browser 400 of FIG. 4 according to the teachings of the present invention. As noted in FIG. 7, the dot 412a has been dragged to a proposed destination of 412c having a distance indication shown by line 412b. Once the dot 412 has been dropped in the proposed location 412b, the information displayed is moved downward, diagonally and to the left for a distance and direction which corresponds to the length of line 412b. If the box 412 has a one-to-one correspondence with the displayed information, then the information has been moved downward, diagonally, and to the left for a portion of the maximum position permitted for such a movement.

Reference now being made to FIG. 8, a diagram is shown illustrating a left downward diagonal movement for moving the information displayed within the browser 400 of FIG. 4 according to the teachings of the present invention. As noted in FIG. 8, the start dot 412a has been dragged to a proposed destination of 412c having a distance indication shown by line 412b. Once start dot 412 has been dropped in the proposed location 412b, the information displayed is moved downward, diagonally and to the left for a distance and direction which corresponds to the length of line 412b. If the box 412 has a one-to-one correspondence with the displayed information, then the information has been moved downward, diagonally, and to the left for the maximum position permitted for such a movement.

Figure 9:
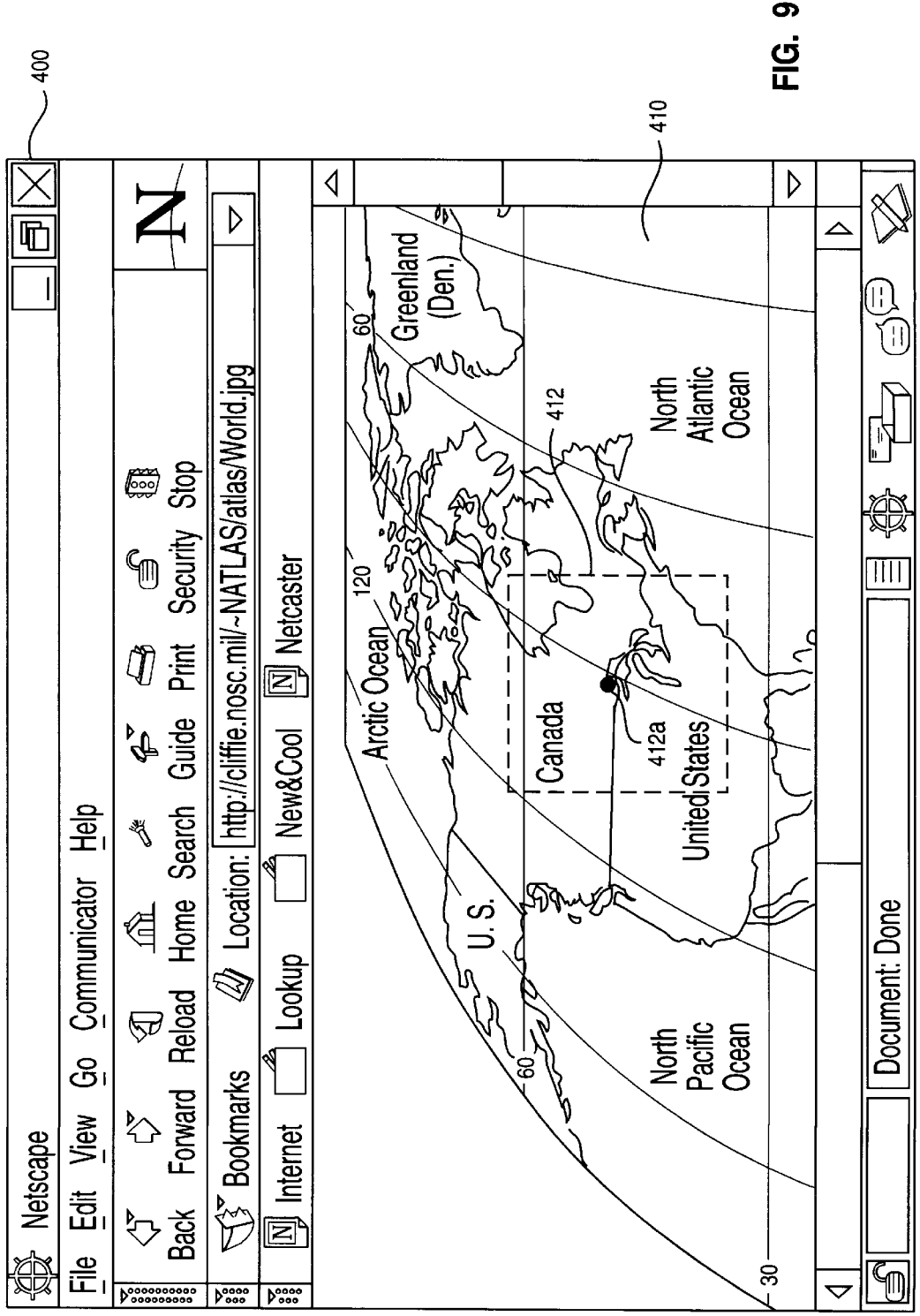
FIG. 9 is a diagram illustrating a preferred embodiment of the invention being practiced within the web browser of FIG. 4 according to the teachings of the present invention.

Reference now being made to FIG. 9, a diagram is shown illustrating a preferred embodiment of the invention being practiced within the web browser 400 of FIG. 4 according to the teachings of the present invention. Located within the display space 410 is an image of a world map (although the image of a world map is shown any image that can not be displayed in its entirety within the display space 410 would be adequate for the explanation that follows).

Also located within the display space 410 is box 412 in a manner as previously described. FIGS. 10–21 illustrate various movements of the image within display space 410 using box 412 as previously described. FIG. 9 represents a home or starting location for each of FIGS. 10–21 described hereinafter, and it is assumed that box 412 has one-to-one correspondence with the image.

Figure 10:
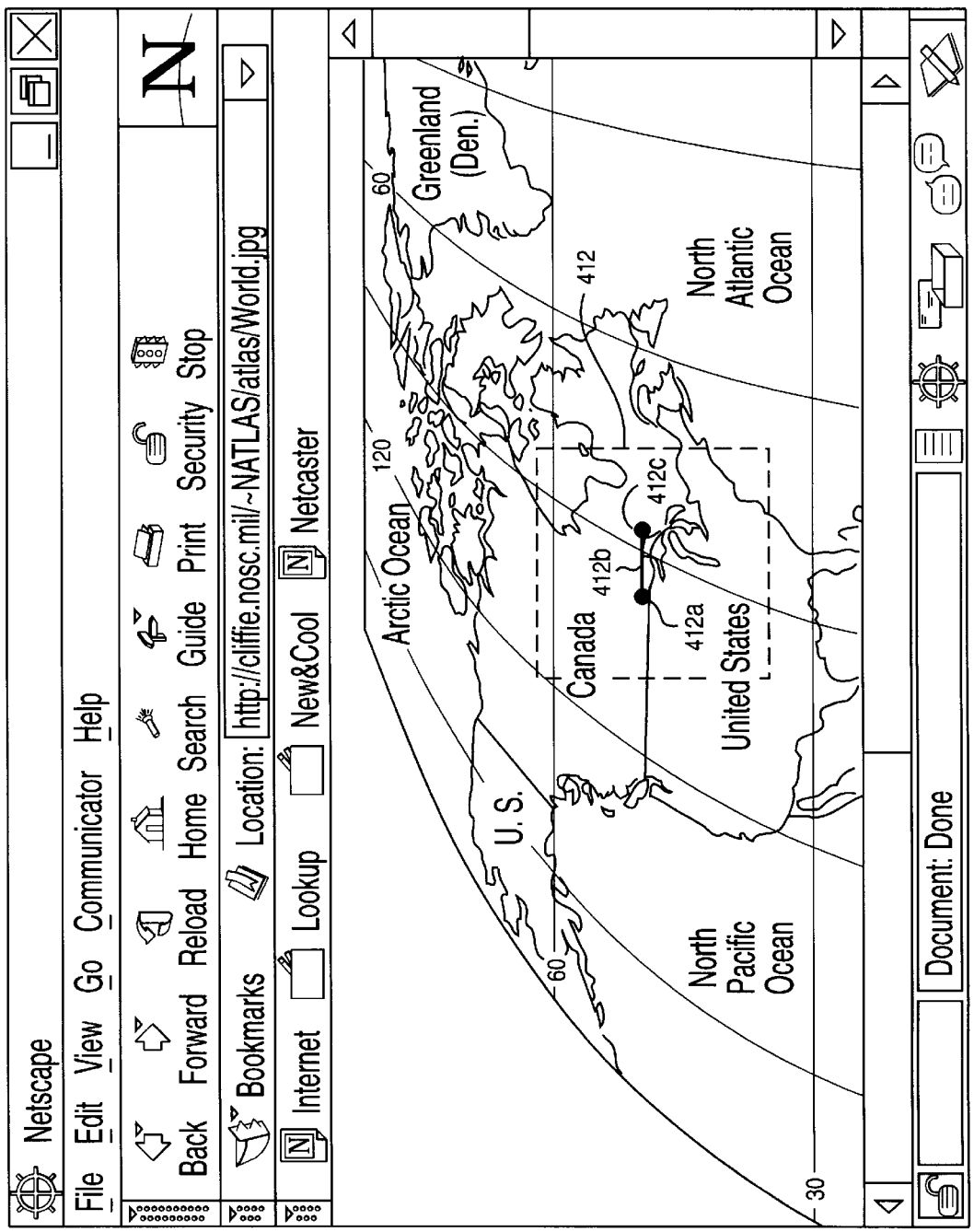
FIG. 10 is a diagram illustrating a right horizontal movement of the image using the box of FIG. 9 according to the teachings of the present invention.

Reference now being made to FIG. 10, a diagram is shown illustrating a right horizontal movement of the image using box 412 of FIG. 9 according to the teachings of the present invention. Specifically, dot 412 is dragged to proposed location 412c and has a speed and direction corresponding to the length of line 412b. In this example, the dot 412 has only been dragged a portion of the maximum distance for such a desired movement. Consequently, the resulting image from the indicated movement should only move horizontally to the right for a short distance.

Figure 11:
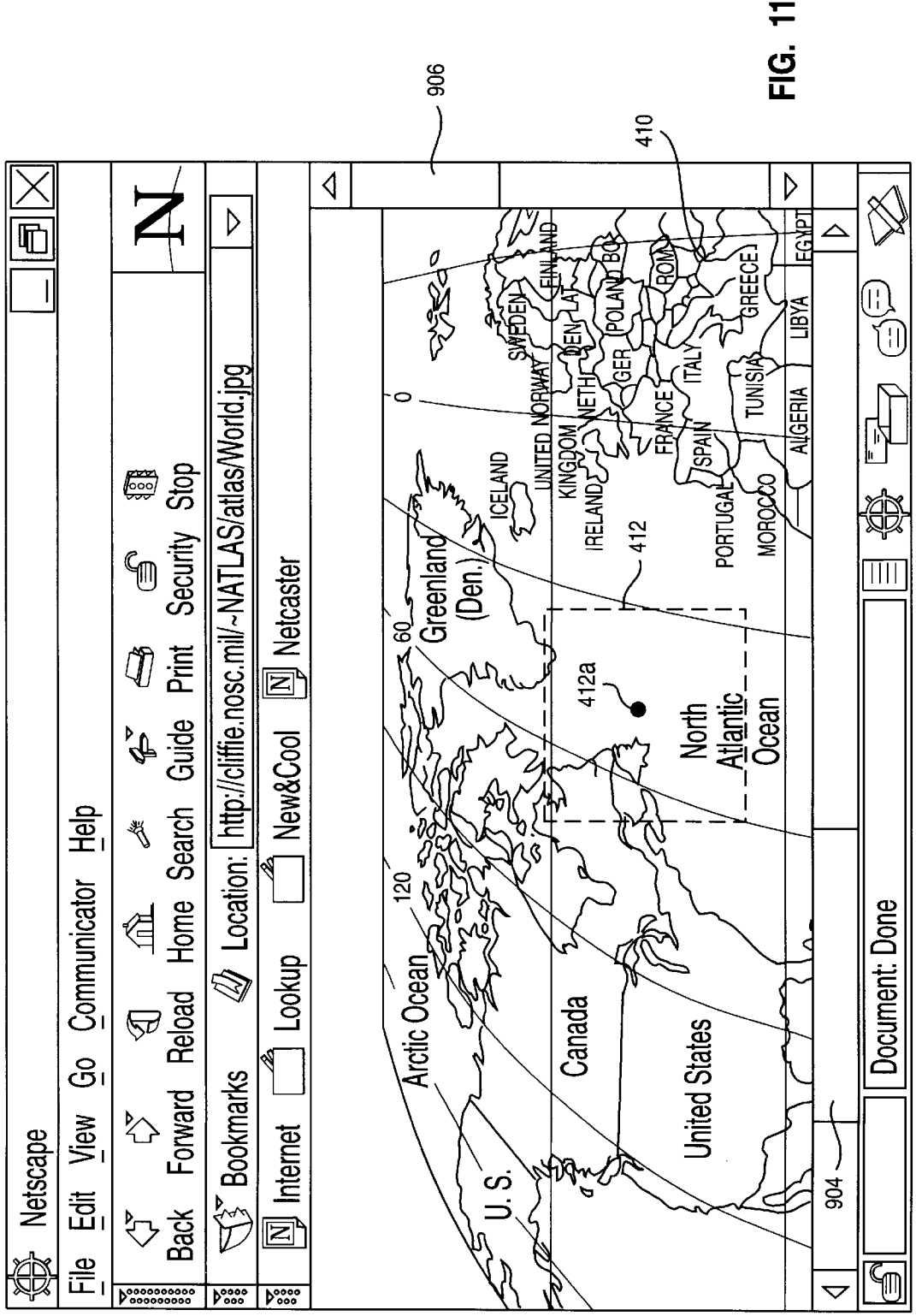
FIG. 11 is a diagram illustrating the image within the web browser of FIG. 4 after the movement described in FIG. 10 has been completed according to the teachings of the present invention.

Reference now being made to FIG. 11, a diagram is shown illustrating the image within the web browser 400 of FIG. 4 after the movement described in FIG. 10 has been completed according to the teachings of the present invention. As noted in FIG. 11, the image has been moved horizontally to the right for a short distance as indicated by scroll bars 906 and 908. It should also be noted that box 412 has not moved from its original location within display area 410. The location of box 412 after an indicated navigation can be selected by the user via standard programming techniques (e.g. menu bars and the like). Although the location of box 412 is fixed in the preferred embodiment of the present invention, it is also contemplated that the location of box 412 could correspond to the displayed image (e.g. movement to the right which has a one-to-one correspondence to the maximum amount of movement permitted in that direction).

Figure 12:
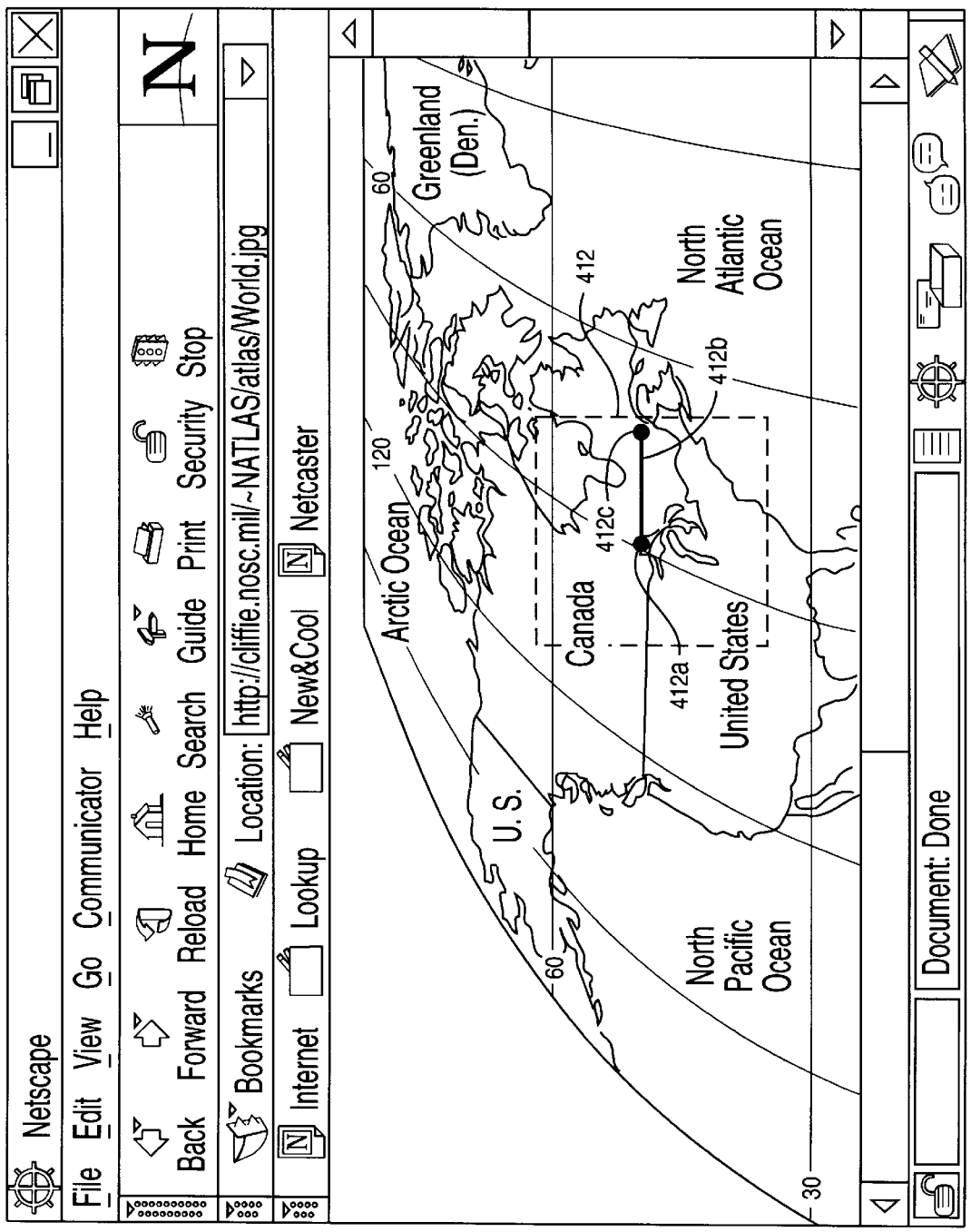
FIG. 12 is a diagram is illustrating a right horizontal movement of the image using the box of FIG. 9 according to the teachings of the present invention.

Reference now being made to FIG. 12, a diagram is shown illustrating a right horizontal movement of the image using box 412. Specifically, dot 412 is dragged to proposed location 412c and has a distance and direction corresponding to the length of line 412b. In this example, the dot 412 has been dragged the maximum distance permitted for such a desired movement. Consequently, the image should move horizontally to the right for the maximum permitted distance.

Figure 13:
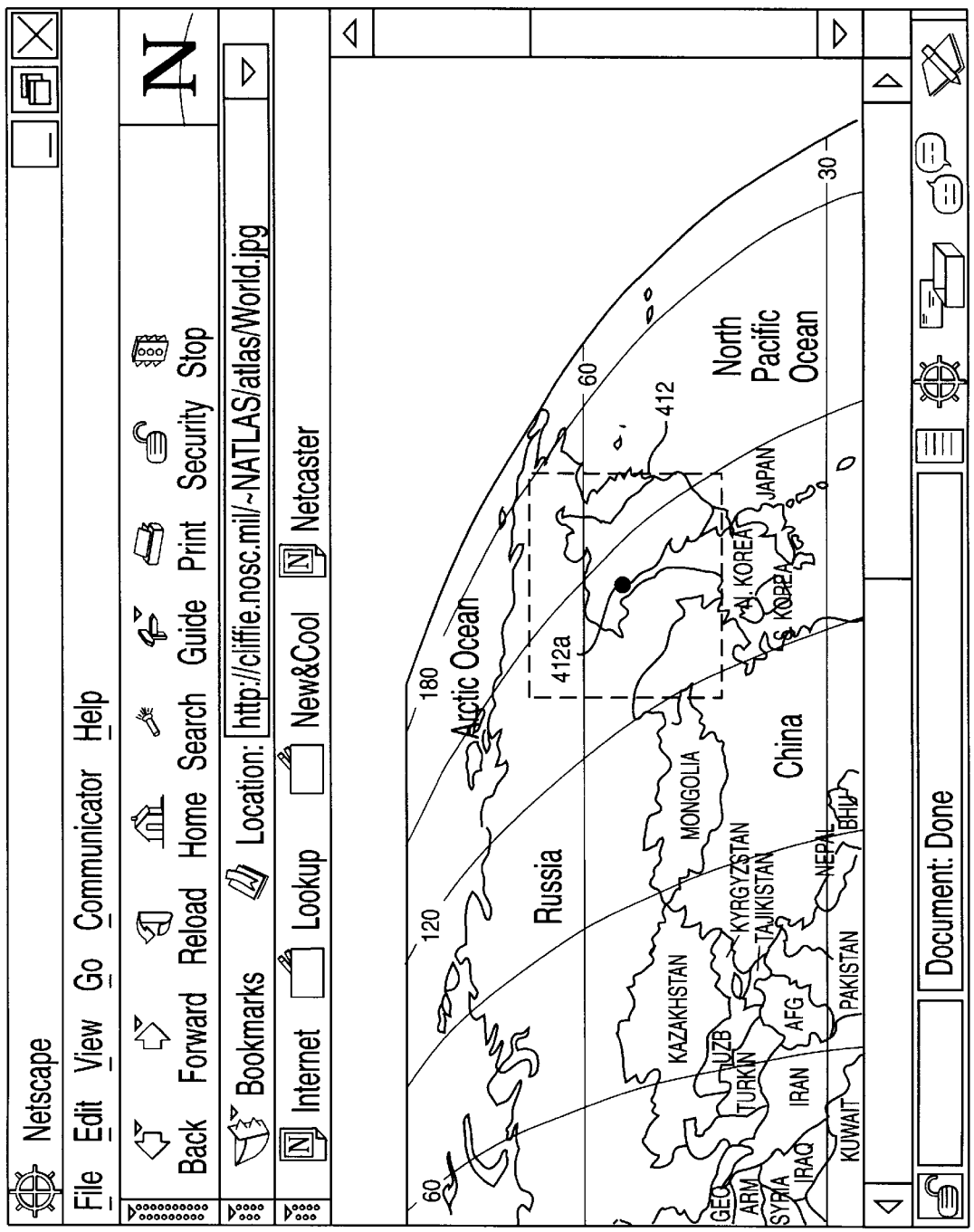
FIG. 13 is a diagram illustrating the image within the web browser of FIG. 4 after the movement described in FIG. 12 has been completed according to the teachings of the present invention.

Reference now being made to FIG. 13, a diagram is shown illustrating the image within the web browser 400 of FIG. 4 after the movement described in FIG. 12 has been completed according to the teachings of the present invention. As noted in FIG. 12, the image has been moved horizontally to the right for the maximum distance permitted for such a movement as indicated by scroll bars 906 and 908. It should also be noted that box 412 has not moved from its original location within display area 410.

Figure 14:
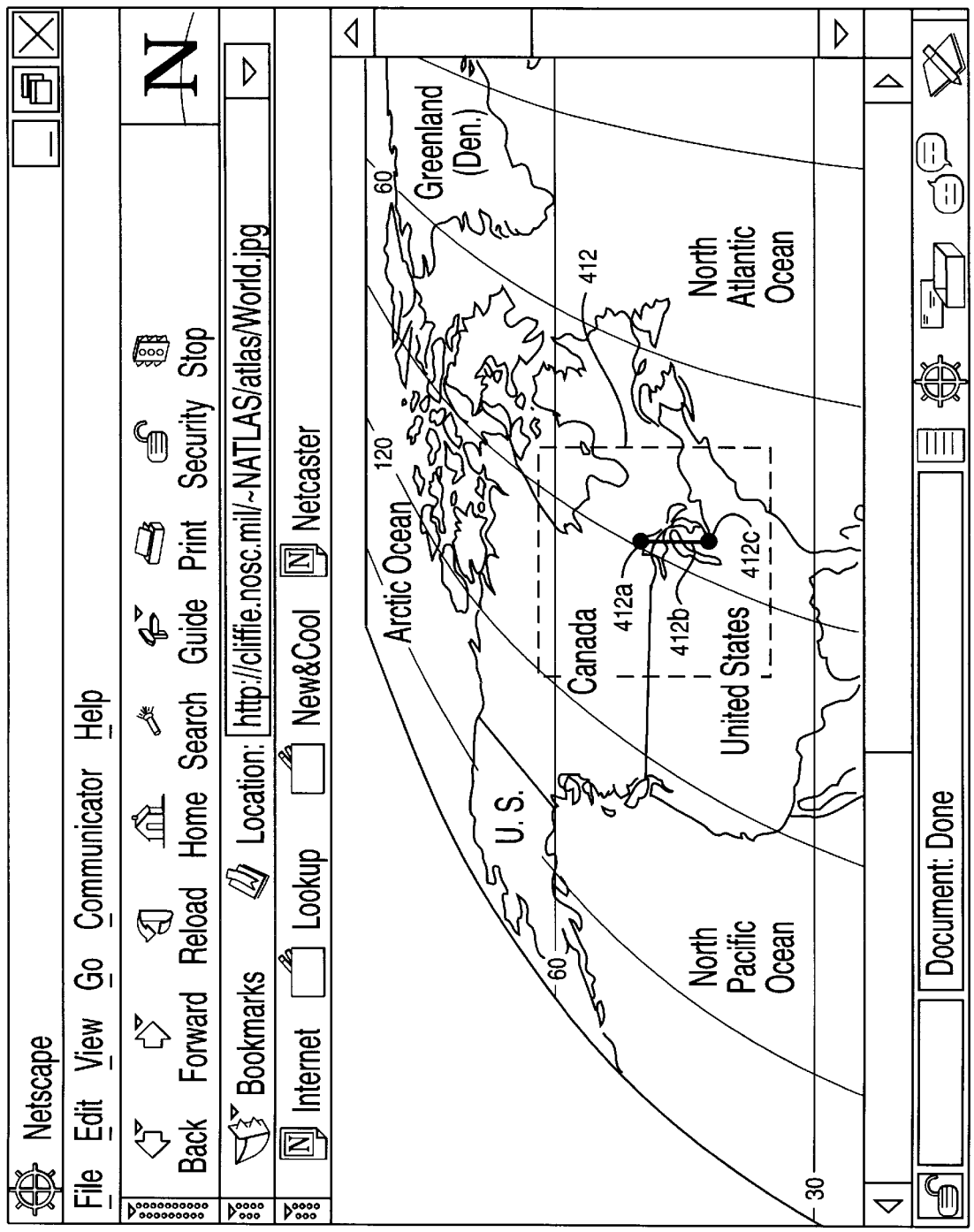
FIG. 14 is a diagram illustrating a down vertical movement of the image using the box of FIG. 9 according to the teachings of the present invention.

Reference now being made to FIG. 14, a diagram is shown illustrating a down vertical movement of the image using box 412. Specifically, dot 412 is dragged to proposed location 412c and has a distance and direction corresponding to the length of line 412b. In this example, the dot 412 has only been dragged a portion of the maximum distance for such a desired movement. Consequently, the image should only move vertically down for a short distance.

Figure 15:
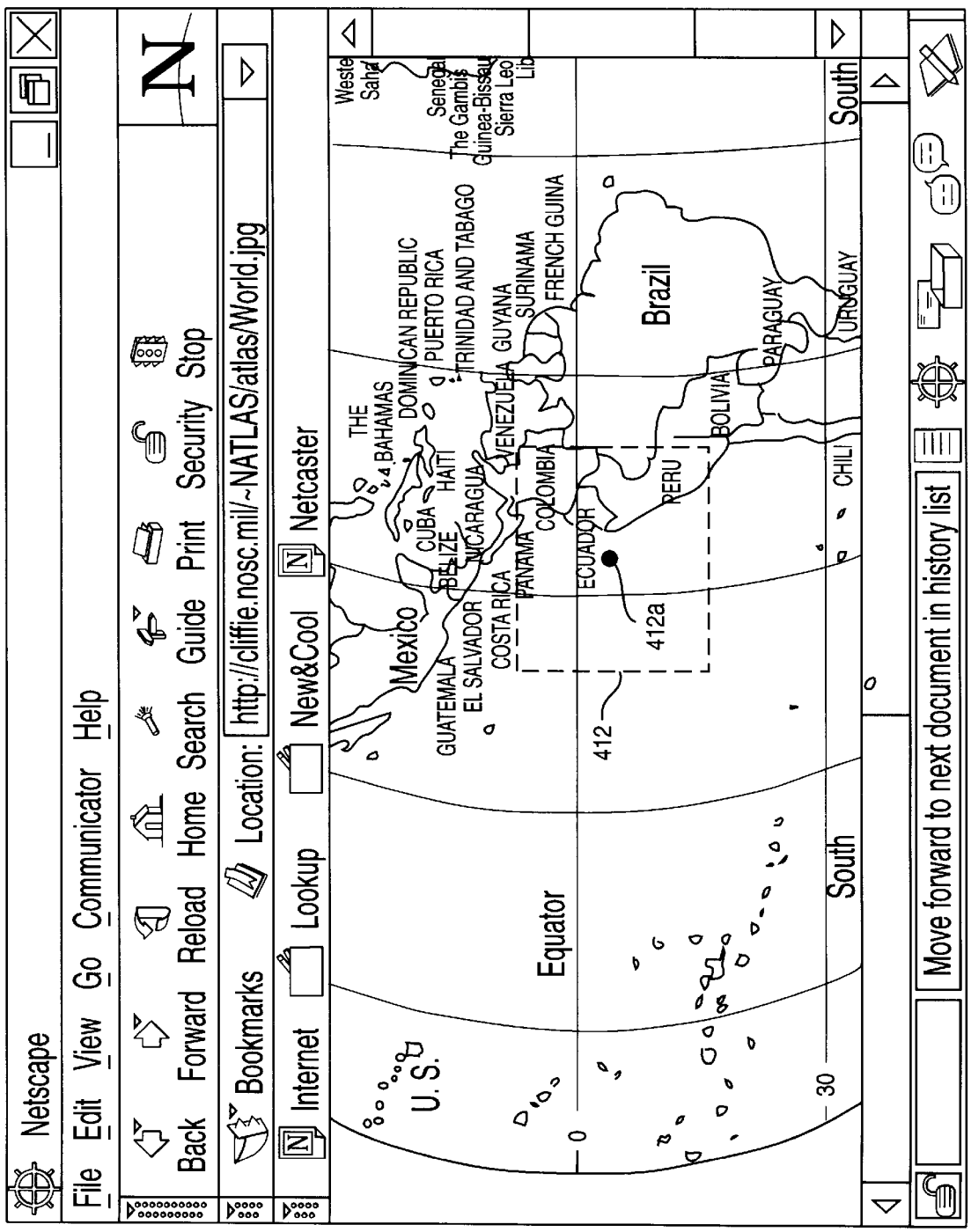
FIG. 15 is a diagram illustrating the image within the web browser of FIG. 4 after the movement described in FIG. 14 has been completed according to the teachings of the present invention.

Reference now being made to FIG. 15, a diagram is shown illustrating the image within the web browser 400 of FIG. 4 after the movement described in FIG. 14 has been completed according to the teachings of the present invention. As noted in FIG. 15, the image has been moved vertically down for a short distance as indicated by scroll bars 906 and 908. It should also be noted that box 412 has not moved from its original location within display area 410.

Figure 16:
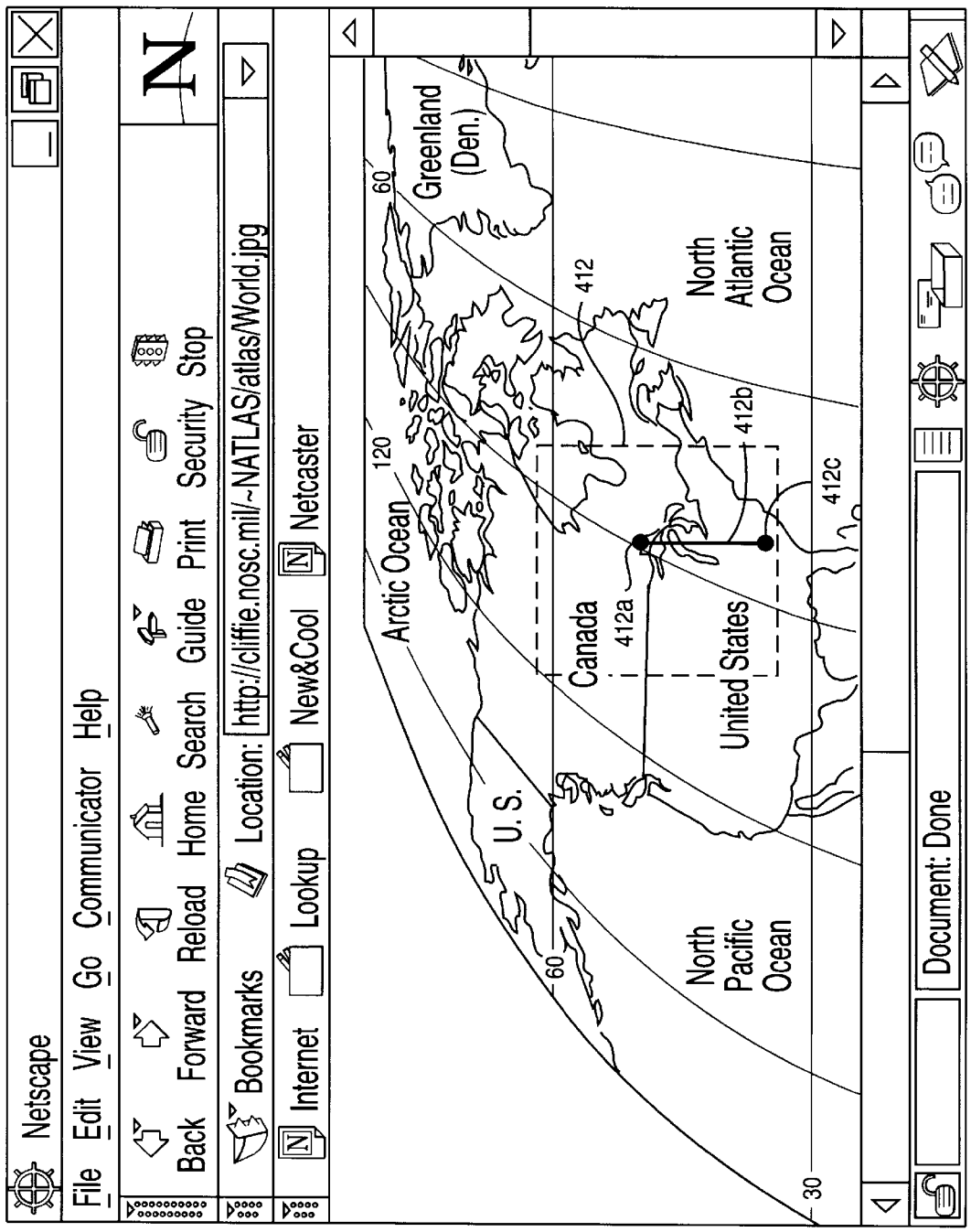
FIG. 16 is a diagram illustrating a down vertical movement of the image using box of FIG. 9 according to the teachings of the present invention.

Reference now being made to FIG. 16, a diagram is shown illustrating a down vertical movement of the image using box 412. Specifically, dot 412 is dragged to proposed location 412c and has a distance and direction corresponding to the length of line 412b. In this example, the dot 412 has only been dragged a portion of the maximum distance for such a desired movement. Consequently, the image should move vertically down for the maximum distance allowed.

Figure 17:
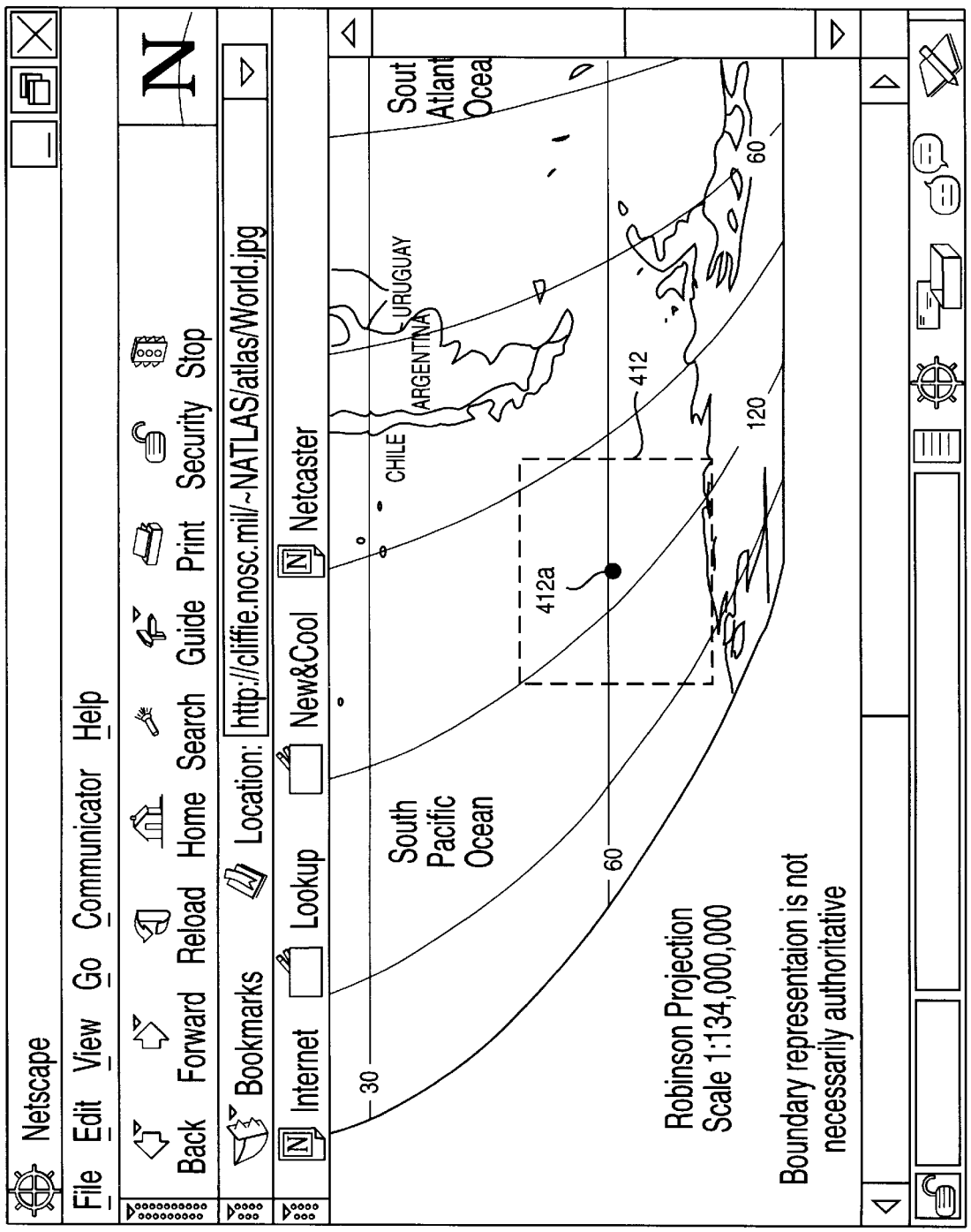
FIG. 17 is a diagram illustrating the image within the web browser of FIG. 4 after the movement described in FIG. 16 has been completed according to the teachings of the present invention.

Reference now being made to FIG. 17, a diagram is shown illustrating the image within the web browser 400 of FIG. 4 after the movement described in FIG. 16 has been completed according to the teachings of the present invention. As noted in FIG. 17, the image has been moved vertically down for the maximum distance permitted for such a movement as indicated by scroll bars 906 and 908. It should also be noted that box 412 has not moved from its original location within display area 410.

Figure 18:
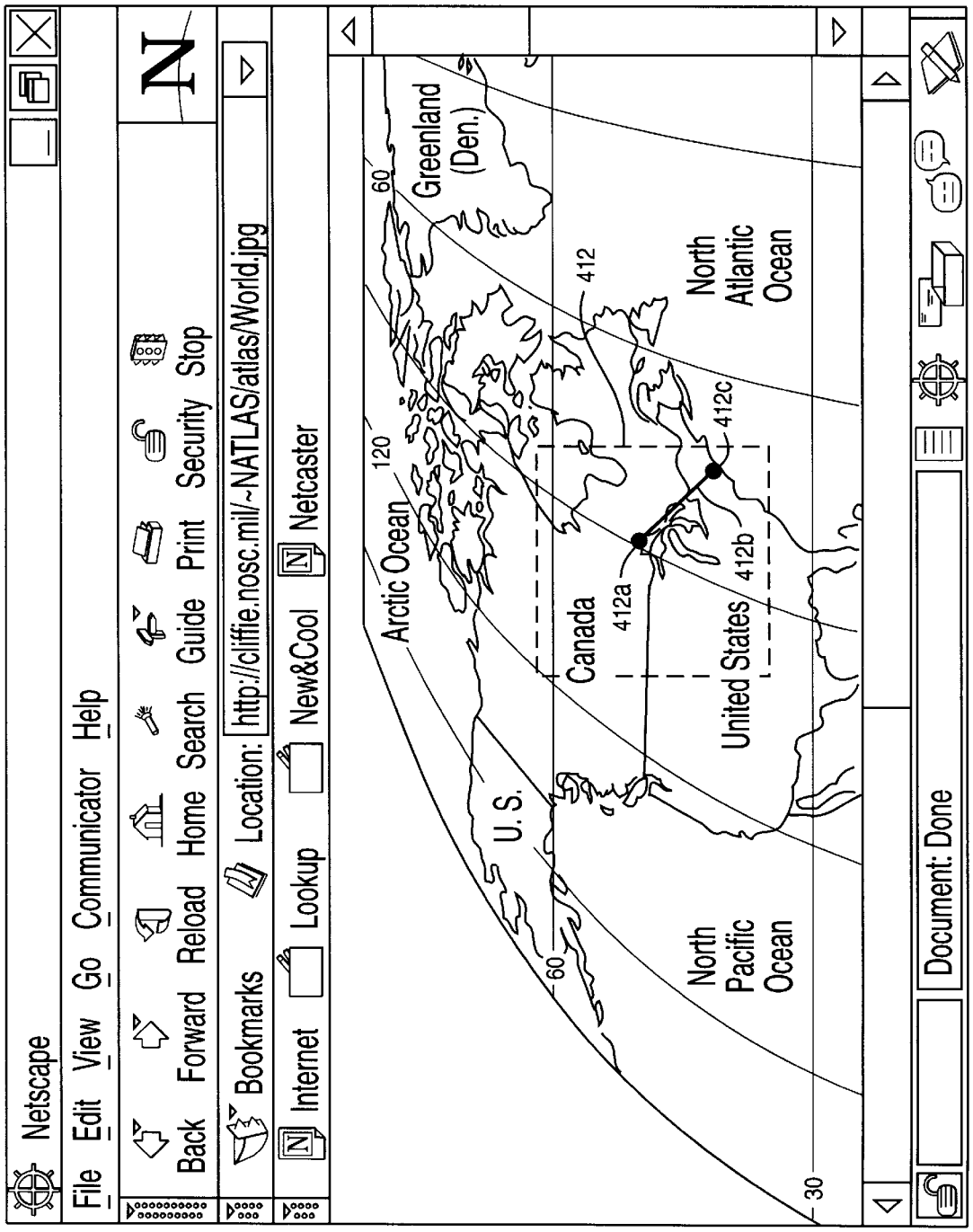
FIG. 18 is a diagram illustrating a right, down, diagonal movement of the image using the box of FIG. 9 according to the teachings of the present invention.

Reference now being made to FIG. 18, a diagram is shown illustrating a right, down, diagonal movement of the image using box 412. Specifically, dot 412 is dragged to proposed location 412c and has a distance and direction corresponding to the length of line 412b. In this example, the start dot 412 has only been dragged a portion of the maximum distance for such a desired movement. Consequently, the image should only move to the right and down for a short distance.

Figure 19:
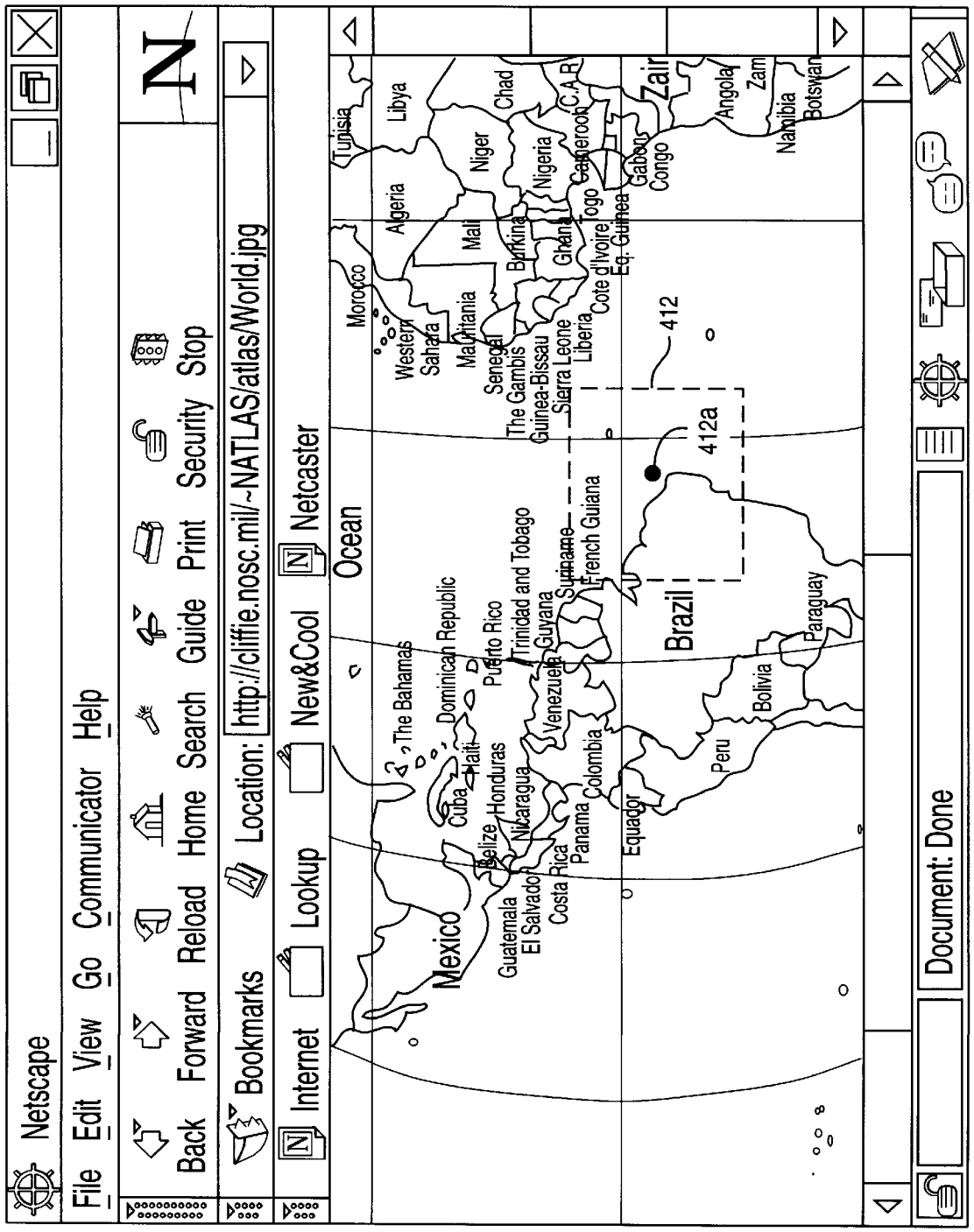
FIG. 19 is a diagram illustrating the image within the web browser of FIG. 4 after the movement described in FIG. 18 has been completed according to the teachings of the present invention.

Reference now being made to FIG. 19, a diagram is shown illustrating the image within the web browser 400 of FIG. 4 after the movement described in FIG. 18 has been completed according to the teachings of the present invention. As noted in FIG. 19, the image has been moved right and down for a short distance as indicated by scroll bars 906 and 908. It should also be noted that box 412 has not moved from its original location within display area 410.

Figure 20:
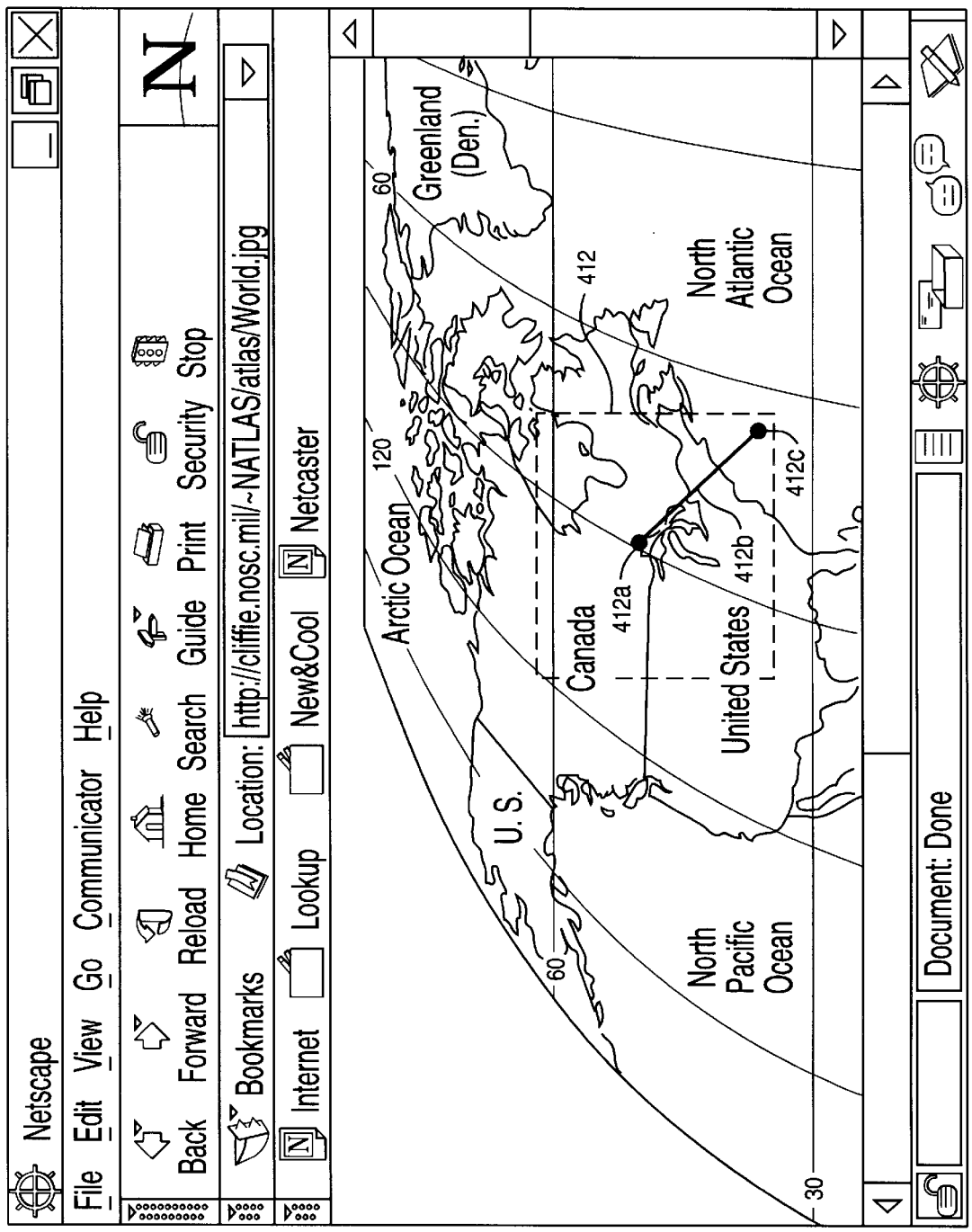
FIG. 20 is a diagram illustrating a right horizontal movement of the image using the box of FIG. 9 according to the teachings of the present invention.

Reference now being made to FIG. 20, a diagram is shown illustrating a right horizontal movement of the image using box 412. Specifically, start dot 412 is dragged to proposed location 412c and has a distance and direction corresponding to the length of line 412b. In this example, the start dot 412 has been dragged the maximum distance for such a desired movement. Consequently, the image should move horizontally to the right for the maximum distance permitted.

Figure 21:
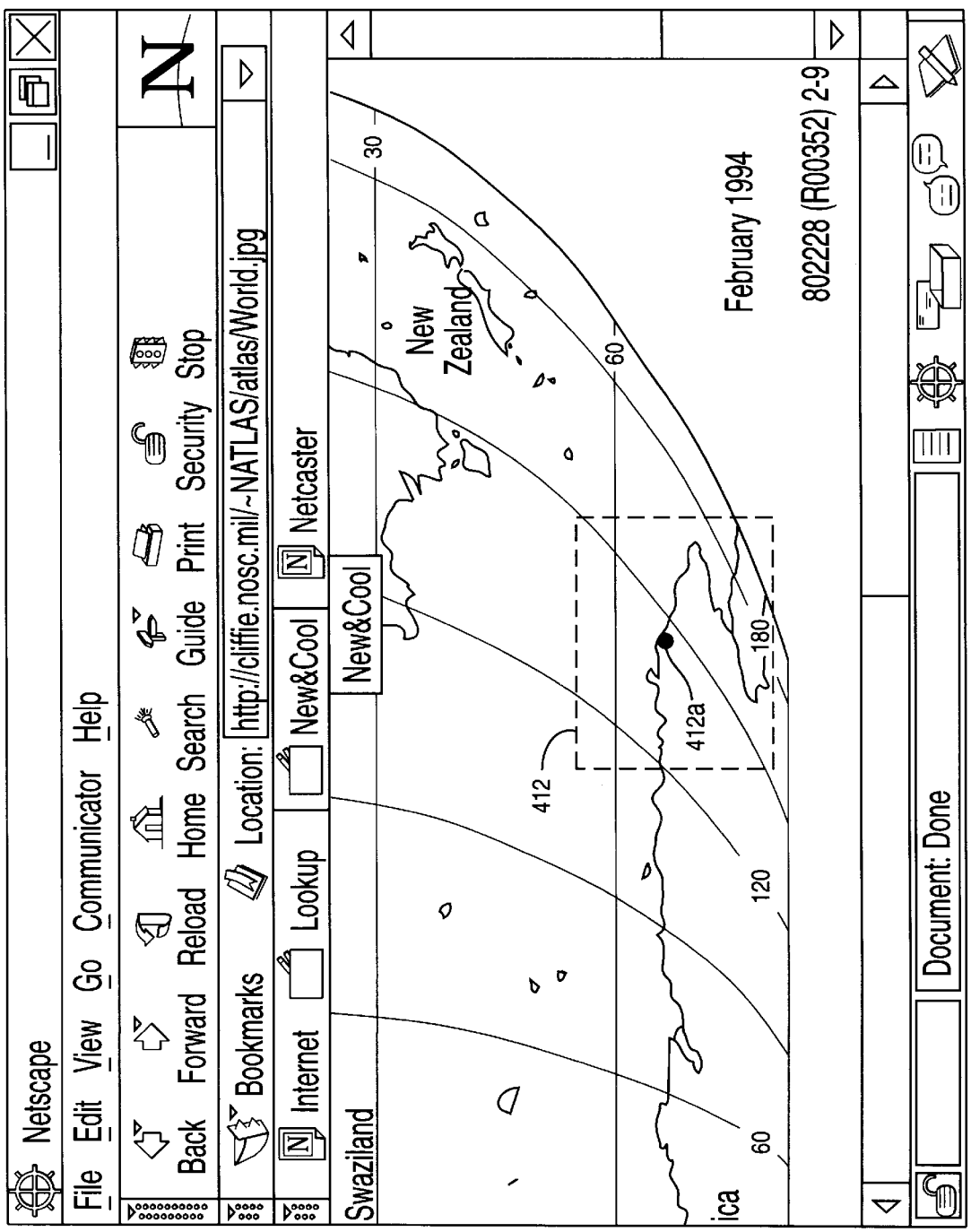
FIG. 21 is a diagram illustrating the image within the web browser of FIG. 4 after the movement described in FIG. 20 has been completed according to the teachings of the present invention.

Reference now being made to FIG. 21, a diagram is shown illustrating the image within the web browser 400 of FIG. 4 after the movement described in FIG. 20 has been completed according to the teachings of the present invention. As noted in FIG. 21, the image has been moved to the right and down for the maximum distance permitted as indicated by scroll bars 906 and 908. It should also be noted that box 412 has not moved from its original location within display area 410.

Although an illustrative embodiment of the present inventions and their advantages have been described in detail herein above, it has been described as example and not as limitation. Various changes, substitutions and alterations can be made in the illustrative embodiment without departing from the breadth, scope and spirit of the present inventions. The breadth, scope and spirit of the present inventions should not be limited by the illustrative embodiment, but should be defined only in accordance with the following claims and equivalents thereof

What is claimed is:

1. A method of navigating an image contained in a window, the method comprising the steps of:

creating a navigational area superimposed on the image and having a shape and color so as to provide minimal interference with the image;

inserting a location indicator into the navigational area;

dragging the location indicator from an initial position to a final position;

indicating, prior to moving the image, the distance from the initial position to the final position; and moving the image, within the confines of the window, in a direction and distance corresponding to the initial and final positions of the location indicator.

2. The method of claim 1 further comprising the step of:

repositioning, after the image has moved, the location indicator back to the initial position.

3. The method of claim 2 wherein the step of dragging is performed using a mouse.

4. The method of claim 2 wherein the step of dragging is performed using a touch screen.

5. The method of claim 2 wherein the navigational area has a one-to-one correspondence with the window.

6. The method of claim 3 further comprising the step of:

dropping the location indicator on the final position.

7. The method of claim 6 wherein the step of moving the image includes:

moving the image, within the confines of the window and in response to the dropping of the location indicator, in a direction and distance corresponding to the initial and final positions of the location indicator.

8. An apparatus for navigating an image contained in a window, the apparatus comprising:

means for creating a navigational area superimposed on the image and having a shape and color so as to provide minimal interference with the image;

means for inserting a location indicator into the navigational area;

means for dragging the location indicator from an initial position to a final position;

means for indicating, prior to moving the image, the distance from the initial position to the final position; and means for moving the image, within the confines of the window, in a direction and distance corresponding to the initial and final positions of the location indicator.

9. The apparatus of claim 8 further comprising:

means for repositioning, after the image has moved, the location indicator back to the initial position.

10. The apparatus of claim 9 wherein the means for dragging is performed using a mouse.

11. The apparatus of claim 9 wherein the means for dragging is performed using a touch screen.

12. The apparatus of claim 9 wherein the navigational area has a one-to-one correspondence with the window.

13. The apparatus of claim 9 further comprising:

means for dropping the location indicator on the final position.

14. The apparatus of claim 13 wherein the means for moving the image includes:

means for moving the image, within the confines of the window and in response to the dropping of the location indicator, in a direction and distance corresponding to the initial and final positions of the location indicator.

15. A computer program product comprising:

a computer readable usable medium having computer readable program code means embodied in the medium for navigating an image contained in a window, the computer readable program code means including means for creating a navigational area superimposed on the image and having a shape and color so as to provide minimal interference with the image;

means for inserting a location indicator into the navigational area;

means for dragging the location indicator from an initial position to a final position;

means for indicating, prior to moving the image, the distance from the initial position to the final position; and means for moving the image, within the confines of the window, in a direction and distance corresponding to the initial and final positions of the location indicator.

16. The computer program product of claim 15 wherein the computer readable program code means further comprises:

means for repositioning, after the image has moved, the location indicator back to the initial position.

17. The computer program product of claim 16 wherein the navigational area has a one-to-one correspondence with the window.

18. The computer program product of claim 16 wherein the computer readable program code means further includes:

means for dropping the location indicator on the final position.

19. The computer program product of claim 18 wherein the means for moving the image includes:

means for moving the image, within the confines of the window and in response to the dropping of the location indicator, in a direction and distance corresponding to the initial and final positions of the location indicator.

\* \* \* \* \*

UNITED STATES PATENT AND TRADEMARK OFFICE
CERTIFICATE OF CORRECTION

PATENT NO : 5,977,970
DATED : November 2, 1999
INVENTOR(S) : Amro et al

It is certified that error appears in the above-identified patent and that said Letters Patent is hereby corrected as shown below:

Column 5, line 26 please delete "browser 400 operating" and insert
--FIG. 4, a diagram is--.

Signed and Sealed this

Twenty-first Day of November, 2000

Attest:

Q. TODD DICKINSON

*Attesting Officer*      *Director of Patents and Trademarks*